«12» United States Patent
Miyashita

(10) Patent No.: US 10,864,642 B2
(45) Date of Patent: Dec. 15, 2020

(54) COMPLIANCE UNIT

(71) Applicant: KOGANEI CORPORATION, Tokyo (JP)

(72) Inventor: Takeshi Miyashita, Tokyo (JP)

(73) Assignee: KOGANEI CORPORATION, Tokyo (JP)

( * ) Notice: Subject to any disclaimer, the term of this patent is extended or adjusted under 35 U.S.C. 154(b) by 39 days.

(21) Appl. No.: 16/337,368

(22) PCT Filed: Sep. 4, 2017

(86) PCT No.: PCT/JP2017/031722
§ 371 (c)(1),
(2) Date: Mar. 27, 2019

(87) PCT Pub. No.: WO2018/066284
PCT Pub. Date: Apr. 12, 2018

(65) Prior Publication Data
US 2020/0030996 A1   Jan. 30, 2020

(30) Foreign Application Priority Data

Oct. 5, 2016   (JP) ................. 2016-197300

(51) Int. Cl.
*B25J 17/02*   (2006.01)
*B25J 9/10*   (2006.01)
*B25J 15/06*   (2006.01)

(52) U.S. Cl.
CPC .......... *B25J 17/0208* (2013.01); *B25J 9/102* (2013.01); *B25J 15/0616* (2013.01); *B25J 17/0266* (2013.01); *B25J 17/0275* (2013.01)

(58) Field of Classification Search
CPC .... B25J 9/102; B25J 15/0616; B25J 17/0208; B25J 17/0266; B25J 17/0275
See application file for complete search history.

(56) References Cited

U.S. PATENT DOCUMENTS

| 5,172,922 | A   | 12/1992 | Kowaleski et al. |
| 9,709,119 | B2* | 7/2017  | Kendrick ................. B25J 11/00 |
| 10,315,316 | B2* | 6/2019  | Uchikawa ............ B25J 17/0275 |

FOREIGN PATENT DOCUMENTS

| JP | S61174800 U | 10/1986 |
| JP | S62168294 U | 10/1987 |

(Continued)

OTHER PUBLICATIONS

World Intellectual Property Office, International Search Report for International Application No. PCT/JP2017/031722, dated Nov. 28, 2017, 4 total pages.

*Primary Examiner* — Adam D Rogers
(74) *Attorney, Agent, or Firm* — SoCal IP Law Group LLP; Mark Andrew Goldstein

(57) ABSTRACT

A compliance unit 10 includes a support plate 11, an attaching plate 12, and a fixing disk 22 that has a cylindrical portion 24 fixed to the support plate 11, and an annular, arc surface 26 is formed in a front surface of an annular portion 25 that is provided at a tip of the cylindrical portion 24 so as to protrude radially outside the cylindrical portion. A movable plate 31 is disposed between the annular portion 25 and the support plate 11, and the movable plate 31 is fastened to the attaching plate 12. The attaching plate 12 is provided with an abutment surface 37 opposing the arc surface 26, and the attaching plate 12 is movable to a position where the abutment surface 37 abuts on the arc surface 26 and a position where the abutment surface 37 is separate from the arc surface 26 via a gap 38 between the abutment surface and the arc surface 26.

11 Claims, 7 Drawing Sheets

(56) References Cited

FOREIGN PATENT DOCUMENTS

| | | | | |
|---|---|---|---|---|
| JP | 01234192 A | * | 9/1989 | .......... B25J 17/0208 |
| JP | H01234192 A | | 9/1989 | |
| JP | H09150391 A | | 6/1997 | |
| JP | 2000094377 A1 | | 4/2000 | |
| JP | 2003103489 A | | 4/2003 | |
| WO | 2018066284 A1 | | 4/2018 | |

* cited by examiner

COMPLIANCE UNIT

RELATED APPLICATION INFORMATION

This patent claims priority from International PCT Patent Application No. PCT/JP2017/031722, filed Sep. 4, 2017 entitled, "COMPLIANCE UNIT", which claims priority to Japanese Patent Application No. 2016-197300, filed Oct. 5, 2016 all of which are incorporated herein by reference in their entirety.

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The present invention relates to a compliance unit used for absorbing a positioning error(s) in conveying and positioning a conveyed object.

BACKGROUND ART

A conveying device such as a robot arm is used to convey the conveyed object from a first position to a second position. A gripping member for gripping the conveyed object is mounted onto the conveying device. For example, the conveyed object placed at the first position is gripped by the gripping member, and is moved to the second position. When the conveying device is moved to the respective positions, a relative positional deviation between the conveying device and each of the positions, that is, a positioning error may occur. In order to absorb these positioning errors, a compliance unit is mounted between the conveying device and the gripping member. The compliance unit is also called a compliance module.

Movement of the conveying device to the respective positions may cause the positioning errors in horizontal, axial, and inclined directions of the movement. The positioning error in the horizontal direction is a positional deviation in a direction in which a central axis of the conveying device is displaced in a direction perpendicular to a central axis of each position, that is, in a lateral direction. The positioning error in the axial direction is a positional deviation in an axial direction in which the conveyed object is brought close to each position under the condition that the respective central axis of the first and second positions are coaxial (concentric) with the central axis of the conveying device, this is, a longitudinal direction. The positioning error in the inclined direction is a positional deviation in a direction in which the central axis of the conveyed object is inclined with respect to the central axes of the respective positions.

Patent Document 1 discloses an alignment device having an attaching plate mounted onto a jig, and a support plate mounted onto a moving member. In this alignment device, the attaching plate is mounted onto the attaching plate so as to be movable in: the above-mentioned horizontal direction, that is, X and Y directions extending along the support plate; an axial direction, that is, a Z direction; and an inclined direction of an angle α. In order to lock the attaching plate to a reference position which is an origin position of the support plate, a locking mechanism that includes a piston operating with fluid pressure is provided in an alignment mechanism.

Patent Document 2 discloses a positioning error absorbing device that has a robot attaching plate and a chuck attaching plate. In this device, the chuck attaching plate is slidably mounted onto the robot attaching plate in X and Y directions that extend along the robot attaching plate. The chuck attaching plate can absorb a positioning error in a horizontal direction, but cannot absorb a positioning error in a longitudinal direction. The chuck attaching plate is locked at a reference position of the robot attaching plate by a lock mechanism having a piston.

FIG. 12 of Patent Document 3 describes a compliance unit that includes a robot-arm-side body, and a work-side base. In this compliance unit, a compliance mechanism for rotating the base around three axes is provided between the body and the base. Further, the base is returned to an origin position by an origin returning mechanism provided with a magnet(s), and the base is locked by a lock mechanism having a piston member. Even this compliance unit cannot absorb an error in a longitudinal direction.

RELATED ART DOCUMENTS

Patent Documents

Patent Document 1: Japanese Patent Application Laid-open No. 2000-94377
Patent Document 2: Japanese Patent Application Laid-open No. H9-150391
Patent Document 3: Japanese Patent Application Laid-open No. 2003-103489

SUMMARY OF THE INVENTION

Problems to be Solved by the Invention

When the conveyed object is gripped at the first position and is conveyed to and arranged at the second position, the conveying device is axially shifted (deviated) from a predetermined position with respect to the conveyed object placed at each position in some cases. This makes it impossible to mount onto the conveying device the compliance unit incapable of absorbing the axially, that is, longitudinally positional deviation as disclosed in Patent Documents 2 and 3.

In contrast thereto, the alignment device disclosed in Patent Document 1 can absorb the positional deviation in the axial direction. However, an alignment disk in this alignment device includes a cylindrical portion coupled to an operative plate at an inner peripheral portion thereof, and an abutment rod provided integrally with the piston, protruding toward the operative plate, and point-contacting with a central portion of the operative plate. This configuration requires increasing an axial size (dimension) of the alignment device, thereby making it impossible to miniaturize the alignment device. Further, when the operative plate moves for alignment in a direction of approaching the support plate, the operative plate collides with an arc surface of the abutment rod, so that wear (abrasion) and dent due to the collision occur in a portion (area) where the abutment rod and the attaching plate point-contact with each other. Therefore, durability of the device cannot be enhanced.

An object of the present invention is to provide a compliance unit capable of improving miniaturization and durability.

Means for Solving the Problems

A compliance unit according to the present invention includes: a support plate having a pressure chamber incorporating a reciprocatable piston in an axial direction, the support plate being attaching to a conveying device; a fixing disk having a cylindrical portion fixed to the support plate, and an annular portion provided at a tip of the cylindrical portion so as to protrude radially outside the cylindrical portion, an annular, arc surface being formed in a front surface of the annular portion; an attaching plate providing an abutment surface opposing the arc surface, the attaching plate being movably fastened to the movable plate between a position where the abutment surface abuts on the arc surface and a position separate from the arc surface via the gap between the abutment surface and the arc surface, a gripping member being attached to the attaching plate; a reference position returning mechanism located inside the cylindrical portion, and disposed between the piston and the attaching plate, the mechanism locking the attaching plate at a reference position, in which the attaching plate is movable in a planar direction extending along the support plate, in an axial direction extending along a central axis of the support plate, and an inclined direction inclined to the central axis when no fluid is supplied to the pressure chamber, and the attaching plate is locked at the reference point by supplying fluid to the pressure chamber.

Effects of the Invention

The attaching plate moves in the planar direction extending along the support plate, the axial direction extending along the central axis of the support plate, and the inclined direction inclined to the central axis. When the attaching plate moves in the axial direction toward the support plate, the abutment surface collides with the arc surface which is provided in the annular portion of the fixing disk. The surface-contact of the attaching plate and the fixing disk at a time of occurrence of this collision makes it possible to suppress of occurrence of wear and dent of the abutment surface and the arc surface, and to improve durability of the compliance unit. Since the reference position returning mechanism for returning the compliance unit to an origin position, that is, a reference position is arranged inside the cylindrical portion of the fixing disk, a length of the compliance unit in the axial direction can be shortened, which makes it possible to miniaturize the compliance unit.

DETAILED DESCRIPTION OF PREFERRED EMBODIMENTS

Figure 7:
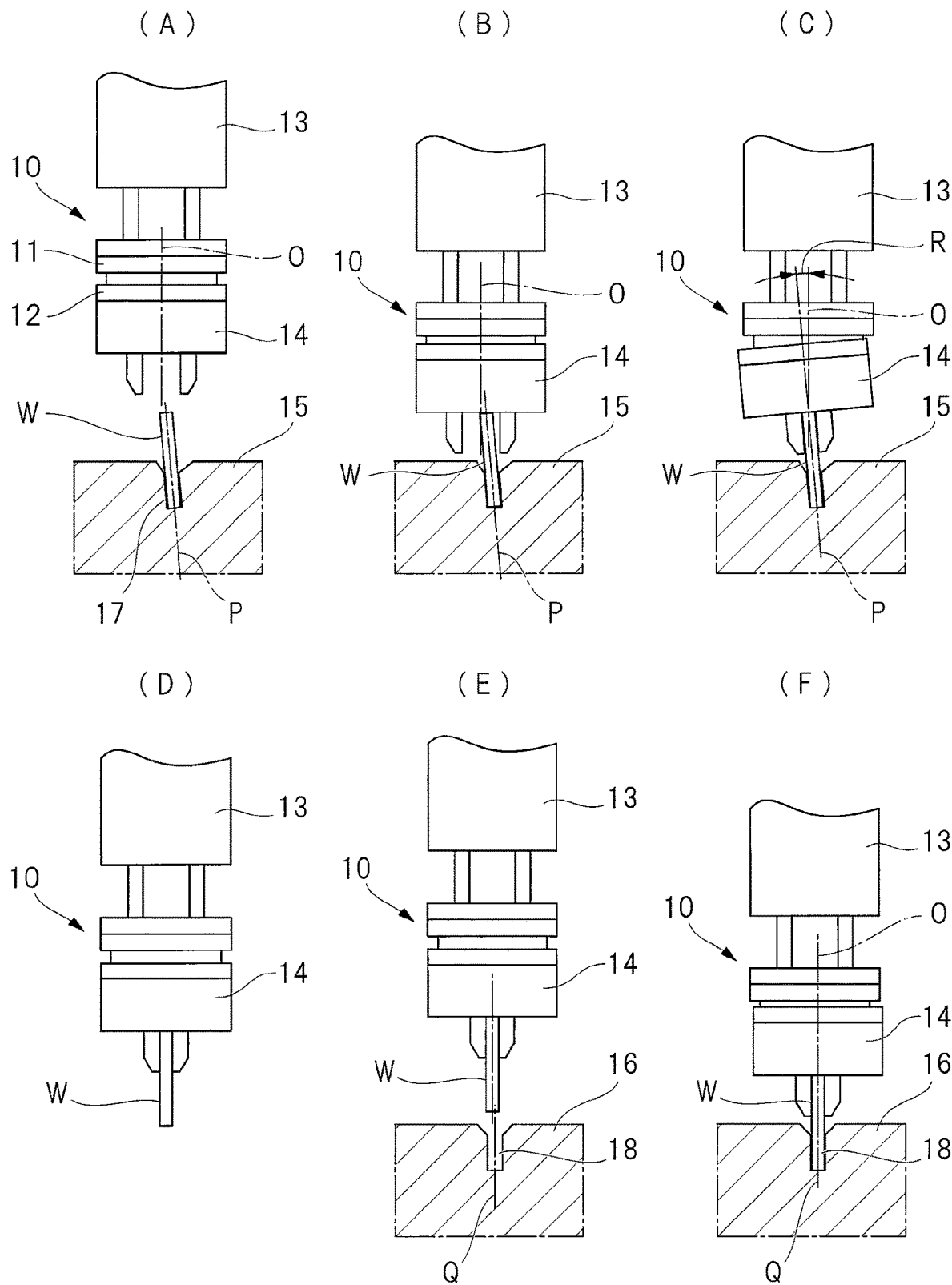
FIGS. 7(A) to 7(F) are conveyance process diagrams showing an example of a component conveying device provided with the compliance device.

Hereinafter, embodiments of the present invention will be described in detail with reference to the drawings. As shown in FIGS. 1 to 4, a compliance unit 10 includes a support plate 11 and an attaching plate 12. As shown in FIG. 7, the support plate 11 is attached to a conveying device 13, and a gripping member 14 is attached to the attaching plate 12. The conveying device 13 is used, for example, to convey a conveyed object W, which is placed in a component accommodating portion 15 as a first position, to a component mounting portion 16 as a second position. In this specification, a back surface and a front surface of the compliance units 10 are respectively defined as a support plate 11 side to be attached to the conveying device 13 and as an attaching plate 12 side on which the gripping member 14 is mounted.

Figure 1:
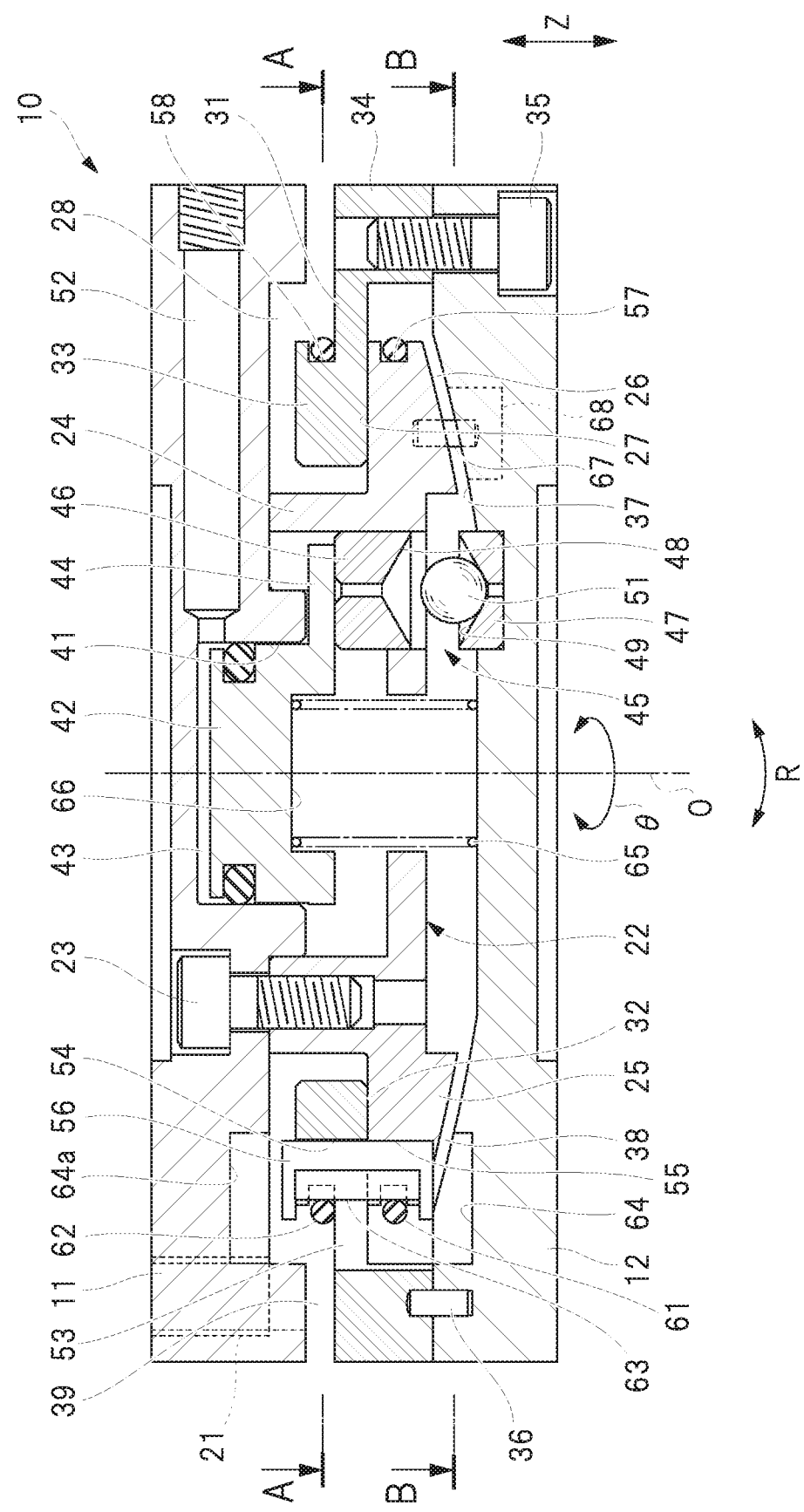
FIG. 1 is a sectional view showing a compliance unit according to an embodiment.

The support plate 11 has a portion whose outer peripheral surface is circular, and its back-surface side is integrally provided with a not-shown flange. As shown in FIG. 1, an attaching hole 21 is provided in the support plate 11 so as to open on the back-surface side of the support plate 11. The number of attaching holes 21 in the support plate 11 is two or more. The support plate 11 is attached to the conveying device 13 by not-shown screw members to be screwed to the attaching holes 21. A fixing disk 22 is fixed to the front surface of the support plate 11. The fixing disk 22 has: a cylindrical portion 24 fastened to the support plate 11 by screw members 23; and an annular portion 25 projecting radially outside the cylindrical portion 24 from a tip of the cylindrical portion 24 and provided integrally with the cylindrical portion 24. An annular, arc surface 26 is formed on the front surface of the annular portion 25. A central axis O is defined as a line that passes through a radial center of the support plate 11 and is perpendicular to the support plate 11. This arrangement makes the arc surface 26 a part of a spherical surface whose curvature radius is centered about a central point located on the central axis O and located in a back-surface direction of the support plate 11. Therefore, the arc surface 26 is a convex surface directed at the front surface of the compliance unit 10.

An annular space 28 is formed between an annular surface 27 on the back-surface side of the annular portion 25 and the support plate 11, and a movable plate 31 is arranged in the space 28. The movable plate 31 is movable within the space 28. A moving direction of the movable plate 31 is: a radial direction of the central axis O, i.e., a planar direction extending along the support plate 11; an axial direction extending along the central axis O; an inclined direction inclined to the central axis O; and a pivotal (turnable) direction centered about the central axis O. The moving plate 31 is movable in any of these directions. The planar direction is defined as a X axis direction. A direction perpendicular to the X axis direction is defined as a Y axis direction. The axial direction is defined as a Z axis direction. The inclined direction is defined as an R direction. The pivotal direction is defined as θ.

The movable plate 31 includes a base portion 33, and a linking portion 34 projecting radially outward from the base portion 33. The base portion 33 is provided with a sliding surface 32 which slidably contacts with the annular surface 27 in the planar direction. The attaching plate 12 is fastened to the movable plate 31 so as to cover a front surface of the fixing disk 22. The attaching plate 12 is fastened to the linking portion 34 by a plurality of screw members 35. A plurality of positioning pins 36 are embedded between the movable plate 31 and the attaching plate 12.

The abutment surface 37 is provided on the attaching plate 12 opposite the arc surface 26. The abutment surface 37 is a concave surface. An area of the abutment surface 37 in the inclined direction is larger than that of the arc surface 26. A gap 38 is formed between the abutment surface 37 and the arc surface 26 under such a state that the sliding surface 32 of the movable plate 31 abuts on the annular surface 27 of the annular portion 25. The gap 38 is smaller than a gap 39 formed between the linking portion 34 and the support plate 11.

When the attaching plate 12 approaches the support plate 11 in the axial direction, the abutment surface 37 abuts on the arc surface 26, that is, contacts the arc surface 26 while striking the arc surface. In this way, the attaching plate 12 is movable in the axial direction between a position where the abutment surface 37 abuts on the arc surface 26 and a position where the attaching plate 12 is disengaged (separate) from the arc surface 26 via the gap 38. When the abutment surface 37 faces (opposes) the arc surface 26 via the gap 38, the attaching plate 12 is movable in the planar direction and is further movable also in the inclined direction. Under the condition that the abutment surface 37 contacts with the arc surface 26, the attaching plate 12 is guided by the arc surface 26 and aslant moves.

Figure 2:
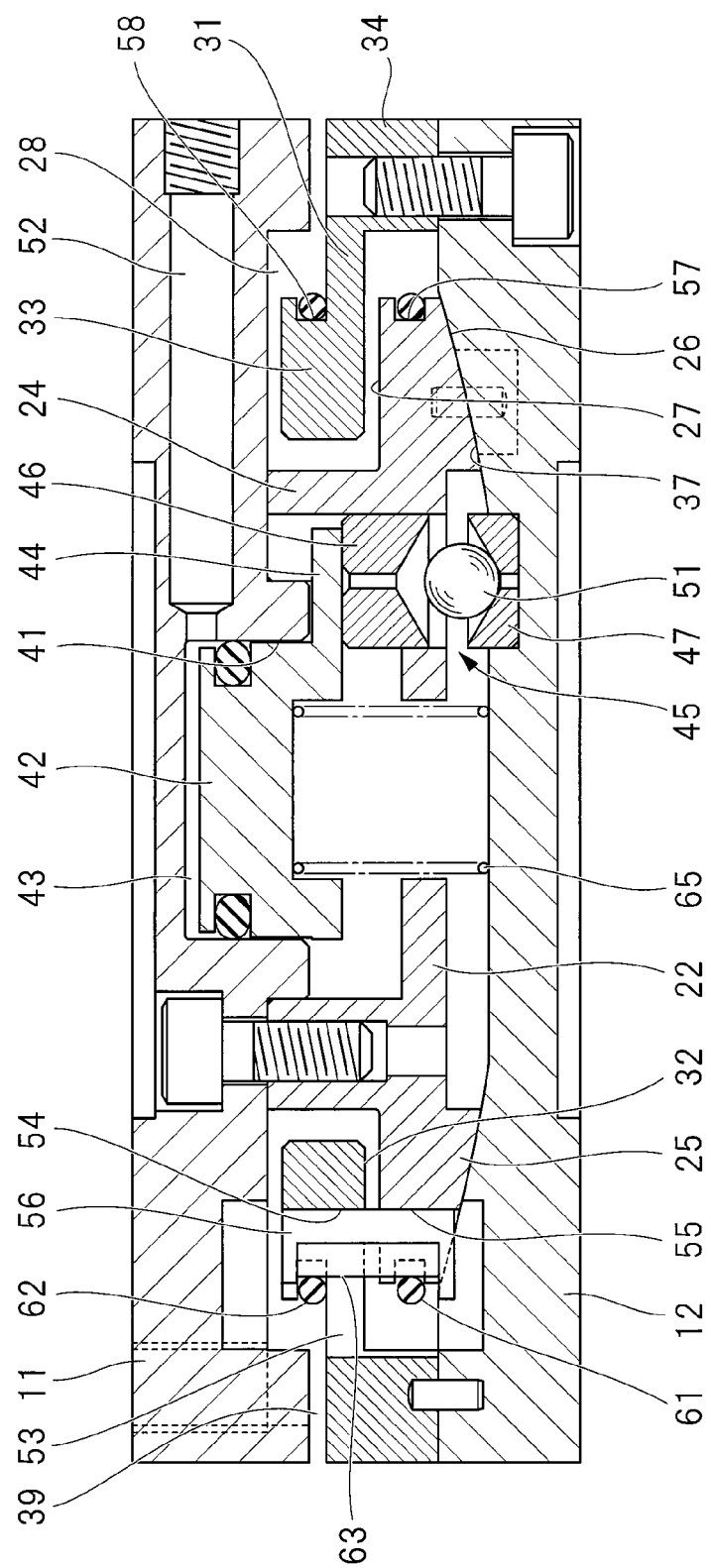
FIG. 2 is a sectional view showing the compliance unit in a state in which an abutment surface of an attaching plate abuts on an arc surface of a fixing plate.
Figure 3:
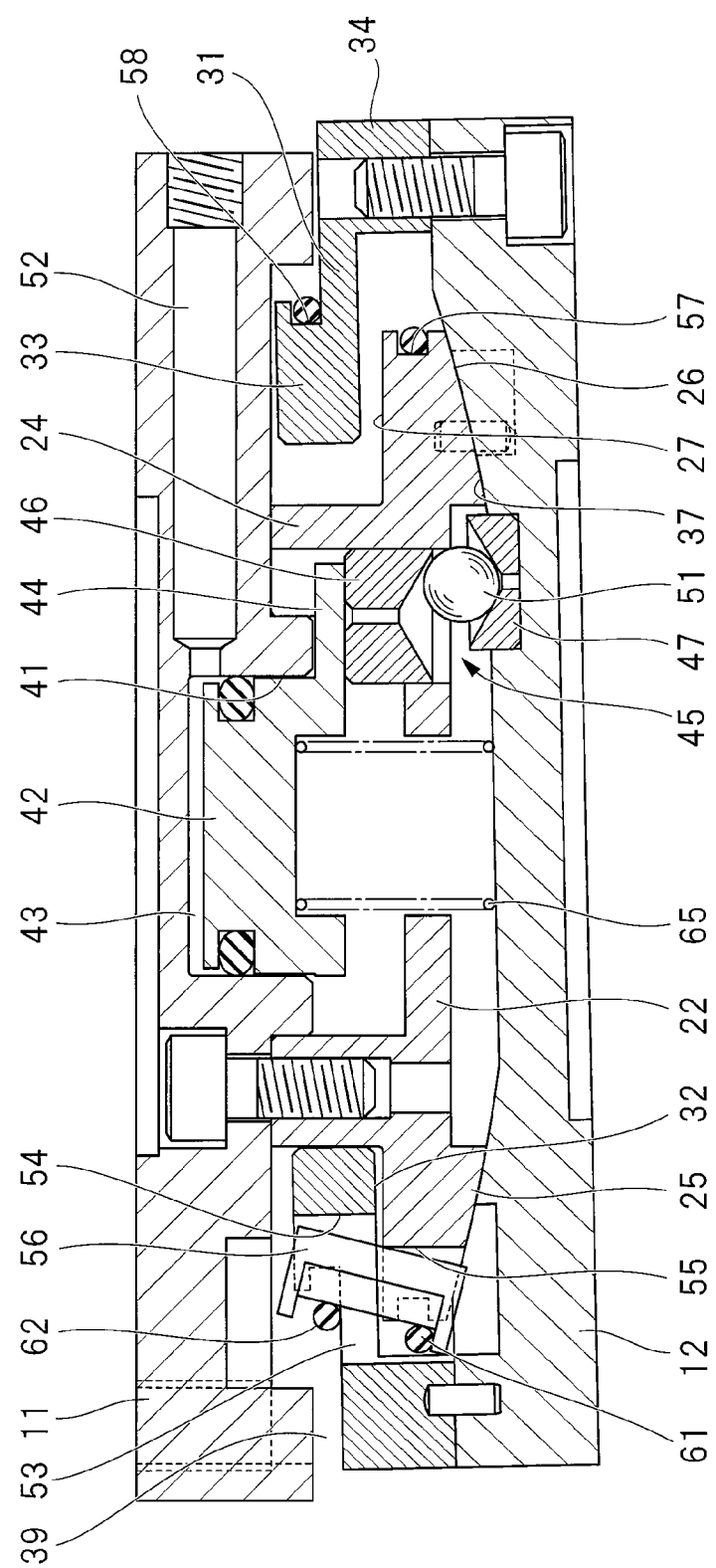
FIG. 3 is a sectional view showing the compliance unit in a state in which the attaching plate aslant (aslope) moves to the fixing plate under an abutting state of the abutment surface against the arc surface.

FIG. 1 shows that the gap 38 is formed between the abutment surface 37 and the arc surface 26, and shows a position where a central axis of the attaching plate 12 is coaxial with the central axis O of the support plate 11, that is, a state in which the attaching plate 12 is located at the reference position. FIG. 2 shows a state in which the abutment surface 37 contacts with the arc surface 26. Further, FIG. 3 shows a state in which the attaching plate 12 is guided by the arc surface 26 and aslant moves under such a state that the abutment portion 37 contacts with the arc surface 26. The attaching plate 12 is pivotable (freely turnable) when the abutment surface 37 faces the arc surface 26 via the gap 38 as shown in FIG. 1, and under such a state that the abutment surface 37 contacts with the arc surface 26 as shown in FIG. 2.

Figure 5:
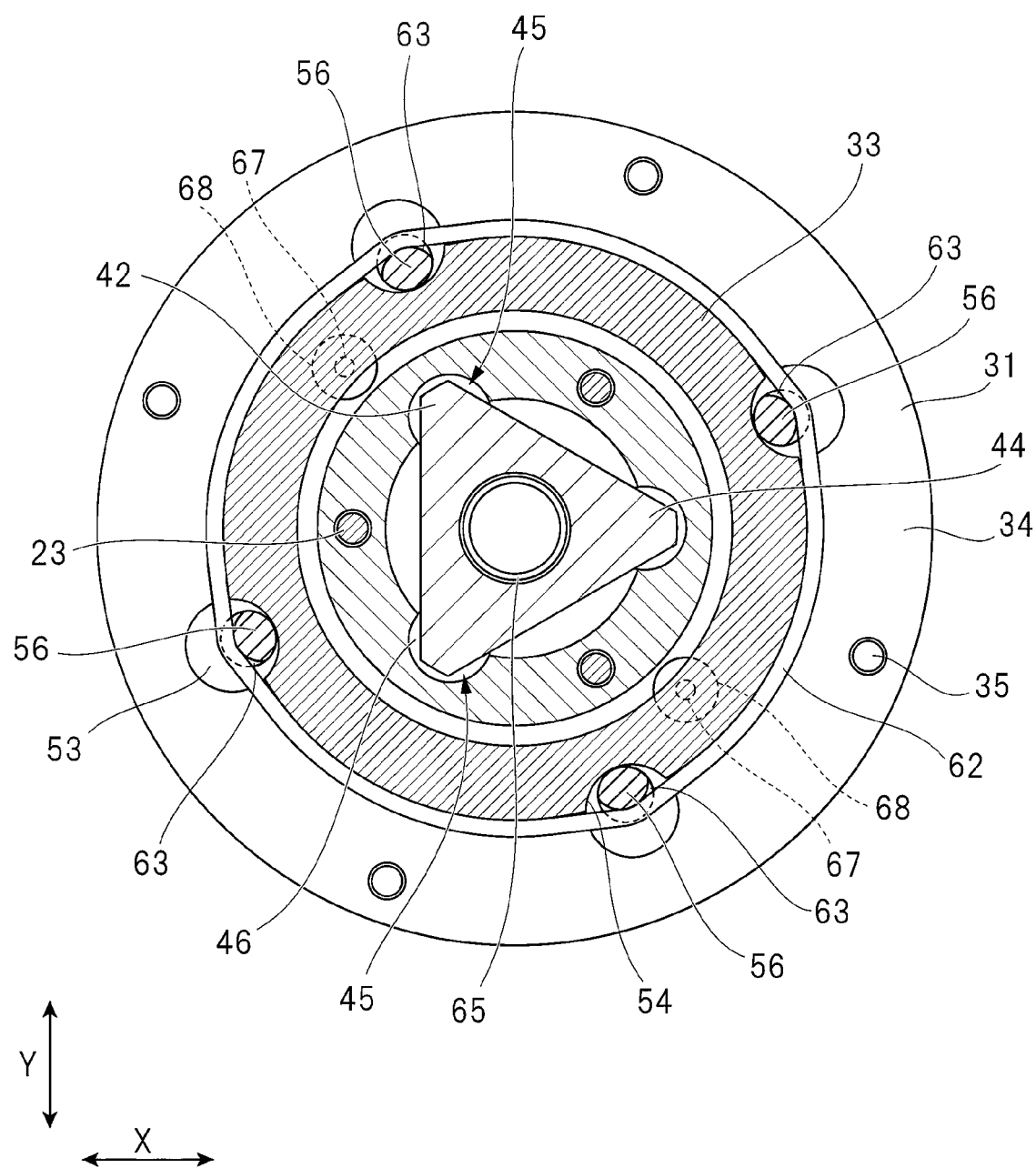
FIG. 5 is a sectional view taken along line A-A in FIG. 1.
Figure 6:
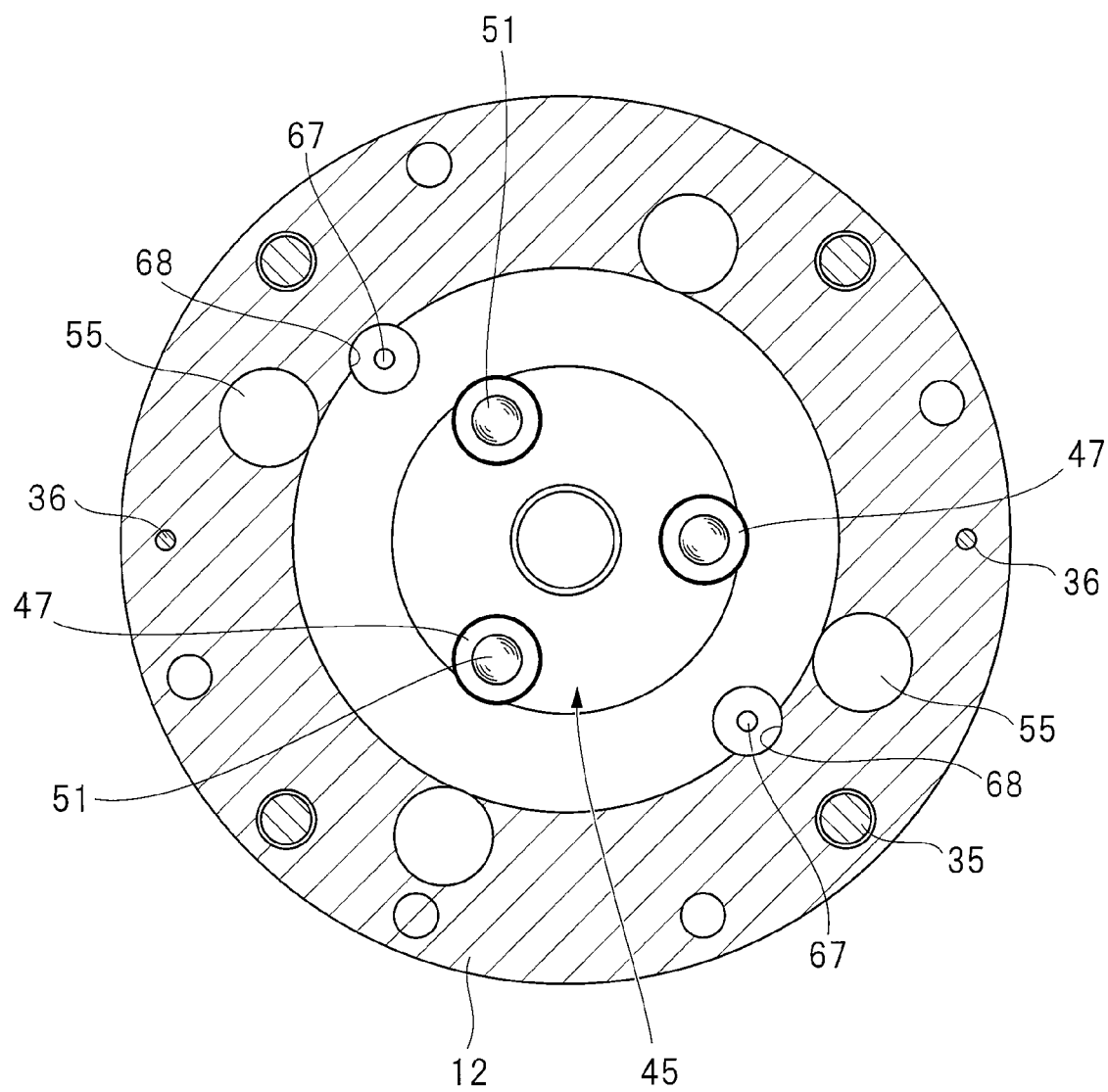
FIG. 6 is a sectional view taken along line B-B in FIG. 1.

A bottomed cylinder hole 41 is provided in the support plate 11. A central axis of the cylinder hole 41 is coaxial with the central axis O, and the cylinder hole 41 opens to the front surface of the support plate 11. A piston 42 is reciprocably (reciprocatably) incorporated in the cylinder hole 41 in the axial direction, and a pressure chamber 43 in which the piston 42 is incorporated is formed (partitioned) by the cylinder hole 41 in the support plate 11. Alignment protrusions 44 are provided to a tip of the piston 42 so as to protrude radially outward. A plurality of reference position returning mechanisms 45 are arranged between each of the alignment protrusions 44 and the attaching plate 12. Each of the reference position returning mechanisms 45 is positioned inside the cylindrical portion 24, and has a holding portion 46 fixed to the alignment protrusion 44, and a housing portion 47 fixed to the attaching plate 12 opposite the holding portion 46. As shown in FIG. 5, three reference position returning mechanisms 45 are provided at equally spaced intervals in a circumferential direction. The holding portion 46 is a separate member from the piston 42 and is attached to the piston 42. However, the holding portion 46 may be formed integrally with the piston 42. Similarly, the housing portion 47 is a separate member from the attaching plate 12 and is attached to the attaching plate 12. However, the housing portion 47 may be formed integrally with the attaching plate 12.

A tapered surface 48 facing the housing portion 47 is formed on the holding portion 46. The tapered surface 48 spreads toward the front surface so that its inner diameter gradually increases from a center portion of the holding portion toward the front surface. A tapered surface 49 opposing the tapered surface 48 is formed on the housing portion 47. The tapered surface 49 spreads toward the back surface so that its inner diameter gradually increases from a center portion of the housing portion to the back surface. A rigid ball 51 is disposed between the holding portion 46 and the housing portion 47. A diameter of the rigid ball 51 is larger in length than a distance between the holding portion 46 and the housing portion 47 that are located when the piston 42 reaches a retract limit position. This makes it possible to prevent the rigid ball 51 from being released from the housing portion 47.

An air passage (channel) 52 communicating with the pressure chamber 43 is provided in the support plate 11, and compressed air is supplied from and discharged to an outside through the air passage 52. When compressed air as fluid is supplied to the pressure chamber 43, the piston 42 protrudes toward the attaching plate 12. The protrusion of the piston 42 allows the rigid ball 51 to be fastened between the holding portion 46 and the housing portion 47, and to be positioned by (at) respective center portions of both of the tapered surfaces 48, 49.

Figure 4:
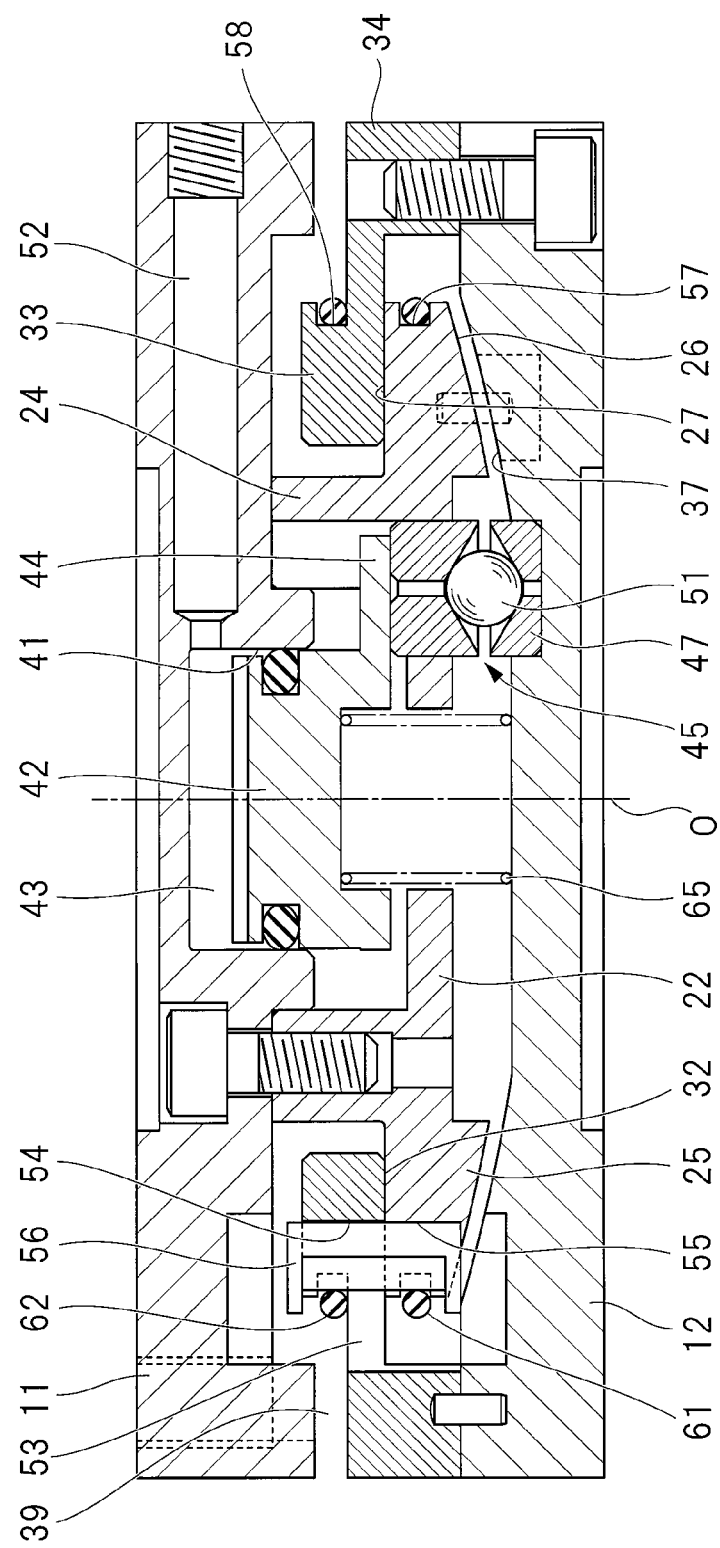
FIG. 4 is a sectional view showing the compliance unit in a state which the attaching plate is locked at a reference position.

FIG. 4 shows a state in which the rigid ball 51 is fastened between the holding portion 46 and the housing portion 47. In this state, the central axis of the attaching plate 12 is aligned (coincides) with the central axis O of the support plate 11. Then, when the base portion 33 presses the annular portion 25, the attaching plate 12 is located in the planar direction extending along the support plate 11, and is locked at the reference position. Meanwhile, when the compressed air in the pressure chamber 43 is discharged to the outside, the attaching plate 12 is movable in an arbitrary direction. In this way, when no fluid is supplied into the pressure chamber 43, the attaching plate 12 is movable even in any of: the planar direction extending along the support plate 11; the axial direction extending along the central axis O of the support plate 11 and the piston 42; the inclined direction inclined to the central axis O; and the pivotal direction centered about the central axis O. Then, as shown in FIG. 4, when fluid is supplied to the pressure chamber 43, the attaching plate 12 is locked at the reference position. Under this locked state, the abutment surface 37 faces the arc surface 26 via the gap 38.

FIG. 7 is conveying process diagrams each showing an example of a component conveying device provided with the compliance unit 10. The gripping member 14 for gripping the conveyed object W is mounted onto the conveying device 13 via the compliance unit 10. In FIG. 7, for example, the conveying device 13 conveys the conveyed object W arranged in the component accommodating portion 15 as a first position to the component mounting portion 16 as a second position.

FIG. 7 shows a case where a central axis P of the conveyed object W, that is, a central axis for the positioning is inclined to the component accommodating portion 15 and is disposed in the housing hole 17. FIG. 7(A) shows a state in which the conveying device 13 approaches the conveyed object W. FIG. 7(B) shows a state in which the conveying device 13 moves so as to approach toward the conveyed object W and the gripping member 14 collides with the conveyed object W. When the gripping member 14 moves downward (descends) over a position of contacting with the conveyed object W, the attaching plate 12 moves so as to approach toward the support plate 11 in the axial direction. The approaching movement of the attaching plate 12 toward the support plate 11 is regulated, as shown in FIG. 2, by the attaching plate 12 colliding with the fixing disk 22. Under this condition, when the conveyed object W is gripped by the gripping member 14, the attaching plate 12 aslant moves as shown in FIG. 7(C). At this time, as shown in FIG. 3, the abutment surface 37 of the attaching plate 12 is guided by the arc surface 26 of the fixing disk 22, and the attaching plate 12 aslant moves in the R direction, that is, swings. When the attaching plate 12 collides with the fixing disk 22, the abutment surface 37 and the arc surface 26 collide with each other in a face-contact manner. This brings suppression of occurrence of wear on the both surfaces due to the collision.

FIG. 7(D) shows a state in which the conveying device 13 moves in a direction separate from the component accommodating portion 15 and the conveyed object W is taken out from the component accommodating portion 15. The conveyed object W is taken out from the housing hole 17, and is conveyed by the conveying device 13 to, for example, the component mounting portion 16 which is the second position. Fluid is supplied from the outside to the pressure chamber 43 under a state where the conveyed object W is taken out from the housing hole 17. This allows, as shown in FIG. 4, the rigid ball 51 to be fastened between the holding portion 46 and the housing portion 47, the central axis of the attaching plate 12 to be coaxial with the central axis O of the support plate 11, and the gap 38 to be formed between the abutment surface 37 and the arc surface 26. This state is a state in which the attaching plate 12 is locked at the reference position.

FIG. 7(E) shows a state in which the conveyed object W moves so as to approach a housing hole 18 of the component mounting portion 16 by the conveying device 13. When the conveyed object W moves so as to approach the housing hole 18, the compressed air in the pressure chamber 43 is discharged to the outside and the locking of the attaching plate 12 is released. FIG. 7(E) shows a case where the central axis O of the support plate 11 deviates in the horizontal direction with respect to a central axis Q of the housing hole 18, that is, a central axis for the positioning. In this case, as shown in FIG. 7(F), when the carrying device 13 is caused to approach the component mounting portion 16, the attaching plate 12 is shifted in the horizontal direction with respect to the support plate 11 and the conveyed object W is inserted into the housing hole 18 and is positioned thereat. When the conveyed object W is inserted into the housing hole 18, the attaching plate 12 moves so as to approach toward the support plate 11 in the axial direction and the abutment surface 37 collides with the arc surface 26. If the housing hole 18 of the component mounting portion 16 is inclined, the attaching plate 12 aslant moves as shown in FIG. 7(C). Then, the conveyed object W is inserted into the housing hole 18. Since the abutment surface 37 and the arc surface 26 contact with each other in a surface-contact manner, the conveyed object W can be also press-fitted into the housing hole 18 while the attaching plate 12 is inclined. Incidentally, when the conveyed object W having a square cross-section is inserted into a square hole, pivot (turn) of the attaching plate 12 makes it possible to insert the conveyed object W into the square hole even if the conveyed object W deviates in a rotational direction with respect to the square hole.

As described above, when the attaching plate 12 moves so as to approach toward the support plate 11, the abutment surface 37 collides with the arc surface 26. Compared with a conventional compliance unit in which an attaching plate contacts with a tip surface of an abutment rod in a line-contact manner, the above-described compliance unit 10 can suppress the occurrence of wear and dent of the abutment surface 37 and the arc surface 26 since both surfaces collides with each other. This suppression makes it possible to improve durability of the compliance unit 10. Additionally, in the compliance unit 10, no abutment rod is provided to the piston 42, the reference position returning mechanism 45 is disposed inside the cylindrical portion 24 of the fixing disk 22, and the movable plate 31 is disposed between the annular portion 25 of the fixing disk 22 and the support plate 11. This arrangement makes it possible to reduce (shorten) an axial length of the compliance unit 10, and to miniaturize the compliance unit 10 in size.

As shown in FIG. 5, a plurality of through holes 53 are formed in the movable plate 31. Four through holes 53 are formed in the movable plate 31 at equally spaced intervals in a circumferential direction. A portion (area) in the base portion 33 of the movable plate 31 becomes a movable-side notched portion 54 having an arc-surface shape due to formation of each through hole 53. As shown in FIG. 1, fixing-side notched portions 55 are formed on (in) an outer peripheral surface of the fixing disk 22, and each notched portion 55 corresponds to the movable-side notched portion 54. An alignment pin 56 penetrates the through hole 53, and is disposed so as to abut on both of the notched portions 54, 55.

As shown in FIG. 1, a fixing-side annular groove 57 is formed in an outer peripheral surface of the fixing disk 22, and a movable-side annular groove 58 is formed in an outer peripheral surface of the base portion 33 of the movable plate 31. A loop-shaped alignment spring member 61 is mounted in the annular groove 57, and the alignment spring member 61 is a first alignment spring member on a fixing side. Similarly, a loop-shaped alignment spring member 62 is mounted in the annular groove 58, and the alignment spring member 62 is a second alignment spring member on a movable side. Each of the alignment spring members 61, 62 is formed of an elastically deformable member such as a metal spring member or rubber.

An engaging concave (recess) portion 63 is formed in a radially outer portion of each of the alignment pins 56. Both alignment spring members 61, 62 are engaged with the engaging concave portions 63 of the respective alignment pins 56. Both end portions of the alignment pin 56 protrude longer than the engaging convex portion 63 toward the radially outer portion, and constitute a stopper for preventing the alignment spring members 61, 62 from being disengaged (released) from the alignment pin 56. A spring force directed toward the central axis of the fixing disk 22 is applied to the attaching plate 12 via the movable plate 31 by the alignment spring members 61, 62. The fixing disk 22 is fastened to the support plate 11 so that the central axis of the fixing disk 22 is coaxial with the central axis O of the support plate 11. Therefore, as shown in FIG. 3, when an external force in the inclined direction with respect to the attaching plate 12 is removed after the slant movement of the attaching plate 12 to the support plate 11, an alignment force is automatically energized to the attaching plate 12 by the alignment spring members 61, 62 toward a position where the central axis of the attaching plate 12 is coaxial with the central axis O of the support plate 11, that is, toward a reference position. As shown in FIG. 1, a bottomed hole 64 is formed in the back surface of the attaching plate 12, and a bottomed hole 64a is formed in the front surface of the support plate 11 so as not to interfere with the alignment pin 56 when the attaching plate 12 aslant moves.

A compression coil spring 65 is disposed, as a spring member, between the piston 42 and the attaching plate 12. A back-surface-side portion of the compression coil spring 65 enters an accommodation groove 66 provided in the piston 42. The compression coil spring 65 energizes a spring force in a direction separate from the fixing disk 22 with respect to the attaching plate 12, and absorbs an impact force caused when the abutment surface 37 abuts on the arc surface 26. This makes it possible to suppress wear and dent on the both surfaces due to the surface contact of the abutment surface 37 and the arc surface 26. Simultaneously, the wear and dent on the both surfaces can be suppressed also by the compression coil spring 65.

The compliance unit 10 including the alignment spring members 61, 62 and the compression coil spring 65 can position the conveyed object even if the component accommodating portion or component mounting portion is inclined or is made vertical.

In order to regulate an amount of pivot (turn) of the attaching plate 12, a stopper pin 67 is provided at the annular portion 25 so as to protrude from the arc surface 26 toward the front direction. A protruding portion of the stopper pin 67 protrudes into a concave (recess) portion 68 provided in a back surface of the attaching plate 12. An inner diameter of the concave portion 68 is larger than an outer diameter of the stopper pin 67. When the attaching plate 12 is pivoted (turned) in the θ direction, contact of the stopper pin 67 with an inner surface of the concave portion 68 regulates the amount of pivot of the attaching plate 12. Adopted as a stopper mechanism in the pivotal (turnable) direction may be such a structure that the stopper pin 67 is provided to the attaching plate 12 and the concave portion 68 is provided to the annular portion 25. In this way, providing the stopper mechanism to the compliance unit 10 makes it possible to prevent the attaching plate 12 from excessively pivoting (turning) and aslant moving even in the compliance unit 10 in which the alignment pin 56 and the alignment spring members 61, 62 are not provided.

The present invention is not limited to the above-described embodiments, and various modifications can be made within a range not departing from the gist thereof. The component conveying device in which the compliance unit 10 is used is not limited to a case shown in FIG. 7, but can be applied to various types of component conveying devices.

INDUSTRIAL APPLICABILITY

This compliance unit is used for conveying and positioning the conveyed object.

It is claimed:
1. A compliance unit comprising:
a support plate including a pressure chamber incorporating a reciprocatable piston in an axial direction, the support plate being attached to a conveying device;
a cylindrical portion fixed to the support plate;
an annular portion provided at a tip of the cylindrical portion so as to protrude radially outside the cylindrical portion, the annular portion having an annular, arc surface formed in its front surface;
a fixing disk having the cylindrical portion and the annular portion;
a movable plate arranged between the annular portion and the support plate;
an attaching plate provided with an abutment surface opposite to the arc surface, and fastened to the movable plate, a gripping member being attached to the attaching plate; and
a reference position returning mechanism located inside the cylindrical portion, and disposed between the piston and the attaching plate, the reference position returning mechanism locking the attaching plate at a reference position,
wherein the attaching plate is movable in a planar direction extending along the support plate, in the axial direction extending along a central axis of the support plate, and in an inclined direction inclined to the central axis when no fluid is supplied to the pressure chamber, and the attaching plate is locked at the reference position by supplying fluid to the pressure chamber.

2. The compliance unit according to claim 1,
wherein the attaching plate is movable between a position where the abutment surface abuts on the arc surface and a position separate from the arc surface via a gap between the abutment surface and the arc surface.

3. The compliance unit according to claim 1,
wherein the arc surface is a convex surface directed at the attaching plate and is part of a spherical surface, a curvature radius of the spherical surface being centered about a center point located on the central axis of the support plate.

4. The compliance unit according to claim 1, further comprising:
alignment pins arranged at a fixing-side notched portion formed in an outer peripheral surface of the fixing disk and at a movable-side notched portion continuous with the fixing-side notched portion and formed in the movable plate;
a first alignment spring member mounted in an annular groove formed in the fixing disk to be engaged with the alignment pins; and
a second alignment spring member mounted in an annular groove formed in the movable plate to be engaged with the alignment pins, the second alignment spring member applying a spring force to the movable plate toward a central axis of the fixing disk along with the first alignment spring member.

5. The compliance unit according to claim 1, further comprising a spring member mounted between the piston and the attaching plate, the spring member energizing a spring force in a direction of separating the attaching plate from the fixing disk.

6. The compliance unit according to claim 1,
wherein the movable plate has a sliding surface slidably contacting with an annular surface of the annular portion in the planar direction, and the attaching plate is guided by the arc surface and aslant moves under states in which the sliding surface is separated from the annular surface and the abutment surface contacts with the arc surface.

7. A compliance unit having a support plate attached to a conveying device, and an attaching plate to which a gripping member is attached, the attaching plate being movably mounted on the support plate in a planar direction extending along the support plate, in an axial direction extending along a central axis of the support plate, and in an inclined direction inclined to the central axis, the compliance unit comprising:

a piston reciprocatably mounted in a pressure chamber in the axial direction, the pressure chamber being provided in the support plate;

a fixing disk having a cylindrical portion fixed to the support plate, and an annular portion provided at a tip of the cylindrical portion so as to protrude radially outside the cylindrical portion, an annular, arc surface being formed in a front surface of the annular portion;

a movable plate having an annular base portion arranged between the annular portion and the support plate, and a linking portion protruding radially outward from the base portion and fastened to the attaching plate;

an abutment surface provided to the attaching plate opposite the arc surface, and guiding movement of the attaching plate in the inclined direction under a state of contacting with the arc surface;

a spring member mounted between the piston and the attaching plate, and energizing a spring force to the attaching plate in a direction separate from the fixing disk; and a reference position returning mechanism located inside the cylindrical portion, and disposed between the piston and the attaching plate, the reference position returning mechanism locking the attaching plate at a reference position, wherein the movement of the attaching plate in the inclined direction is guided by the annular, arc surface, and the attaching plate is locked by the reference position returning mechanism located radially inside the arc surface.

8. The compliance unit according to claim 7, wherein the arc surface is a convex surface directed at the attaching plate and is part of a spherical surface, a curvature radius of the spherical surface being centered about a center point located on the central axis of the support plate.

9. The compliance unit according to claim 7, further comprising:

alignment pins arranged at a fixing-side notched portion formed in an outer peripheral surface of the fixing disk and at a notched portion continuous with the fixing-side notched portion, the notched portion being formed in the movable plate;

a first alignment spring member mounted in an annular groove formed in the fixing disk to be engaged with the alignment pins; and a second alignment spring member mounted in an annular groove formed in the movable plate to be engaged with the alignment pins, the second alignment spring member applying a spring force to the movable plate toward a central axis of the fixing disk along with the first alignment spring member.

10. The compliance unit according to claim 7, wherein the movable plate has a sliding surface slidably contacting with an annular surface of the annular portion in the planar direction, and the attaching plate is guided by the arc surface and aslant moves under states in which the sliding surface is separated from the annular surface and the abutment surface contacts with the arc surface.

11. The compliance unit according to claim 7, further comprising:

an annular surface provided on a back surface of the annular portion; and a sliding surface provided to the base portion of the movable plate, wherein when locking of the attaching plate is released, the attaching plate is movable between positions in the axial direction, the planar direction, and the inclined direction with respect to the fixing disk, the positions being a position where the abutment surface abuts on the arc surface, and being a position where a gap is formed between the abutment surface and the arc surface by abutment of the annular surface and the sliding surface.

* * * * *